July 14, 1925.
W. KASSEBEER
1,545,664
APPARATUS FOR CONVEYING AND LOADING CROPS
Filed June 17, 1922    4 Sheets-Sheet 1
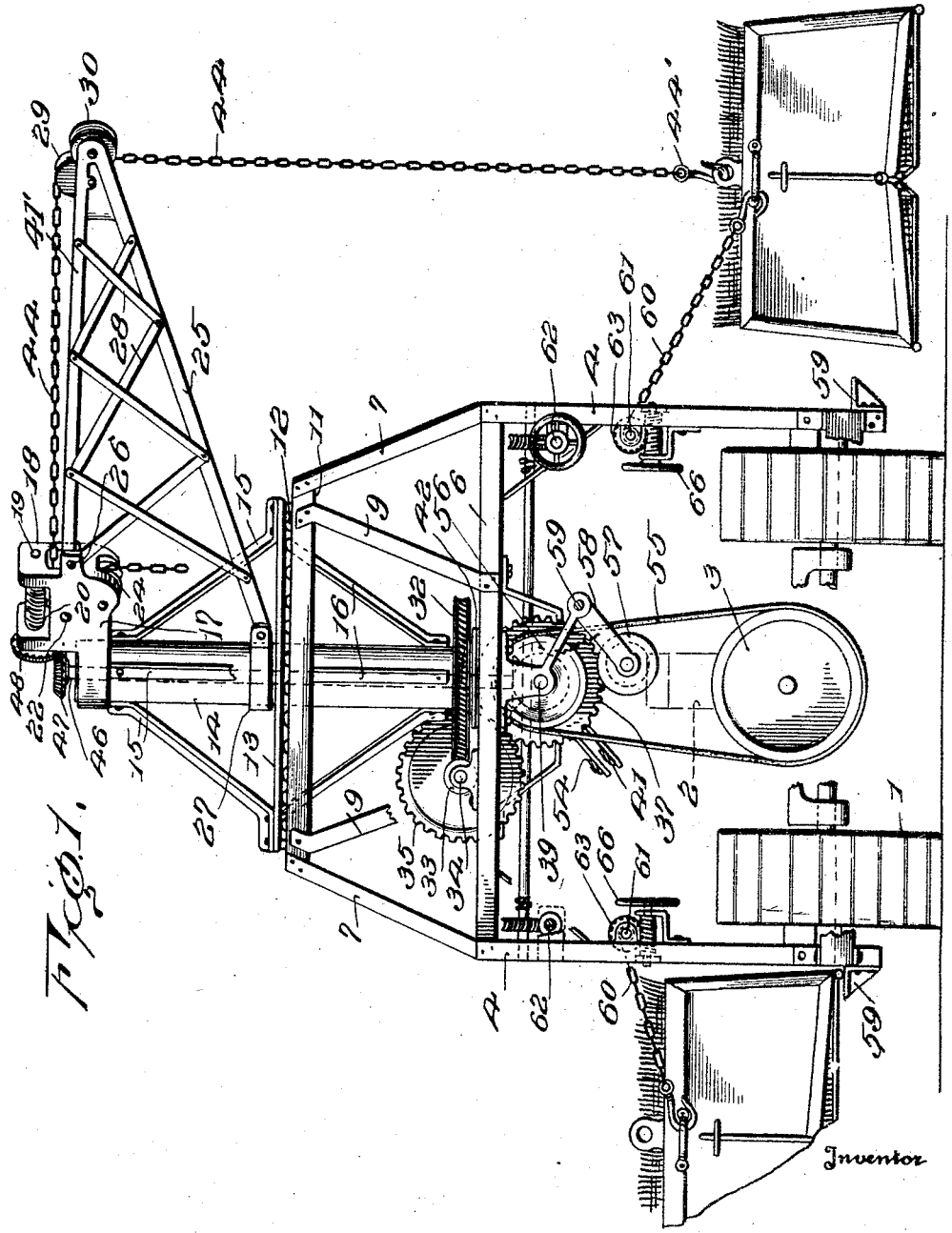

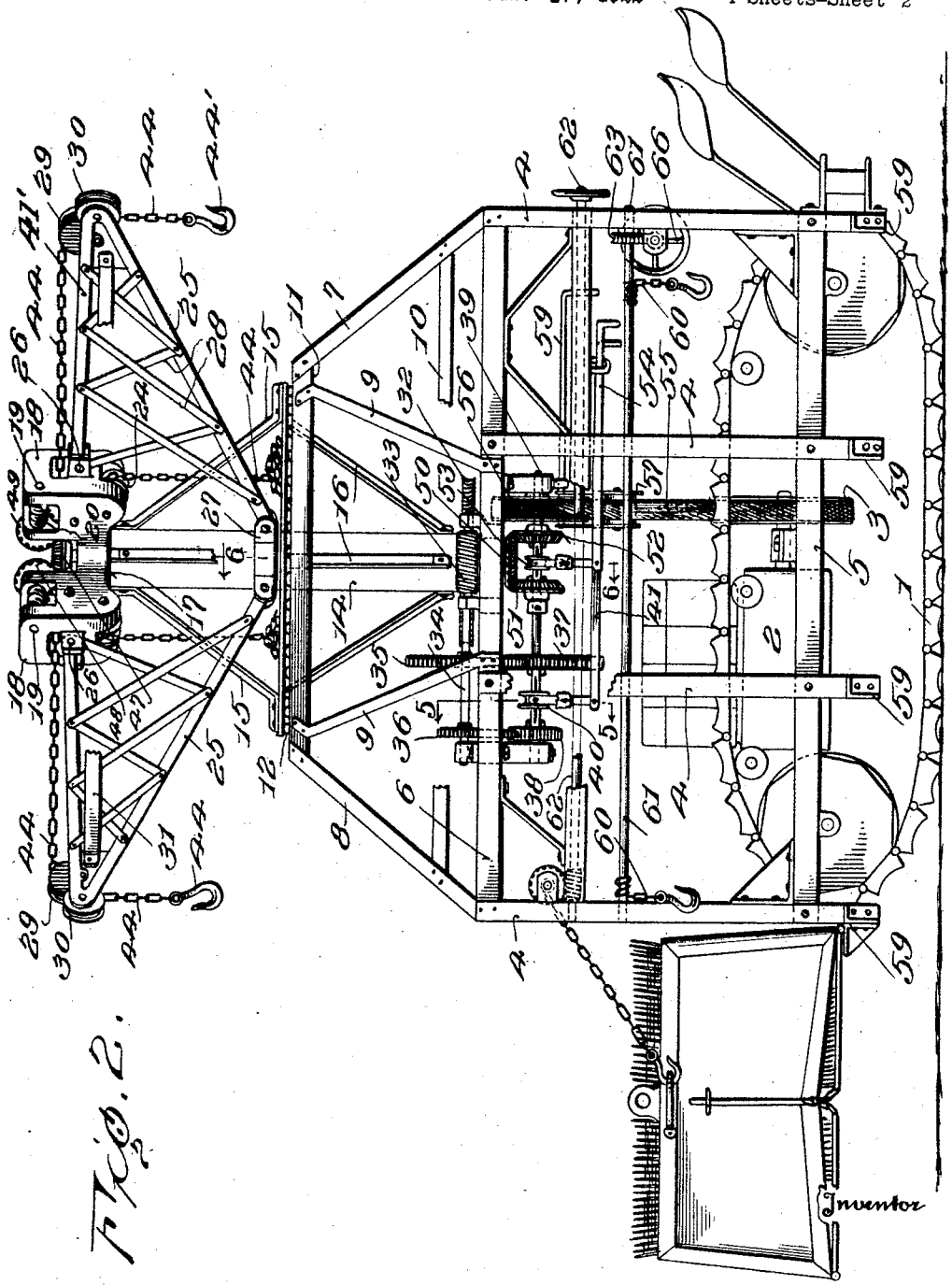

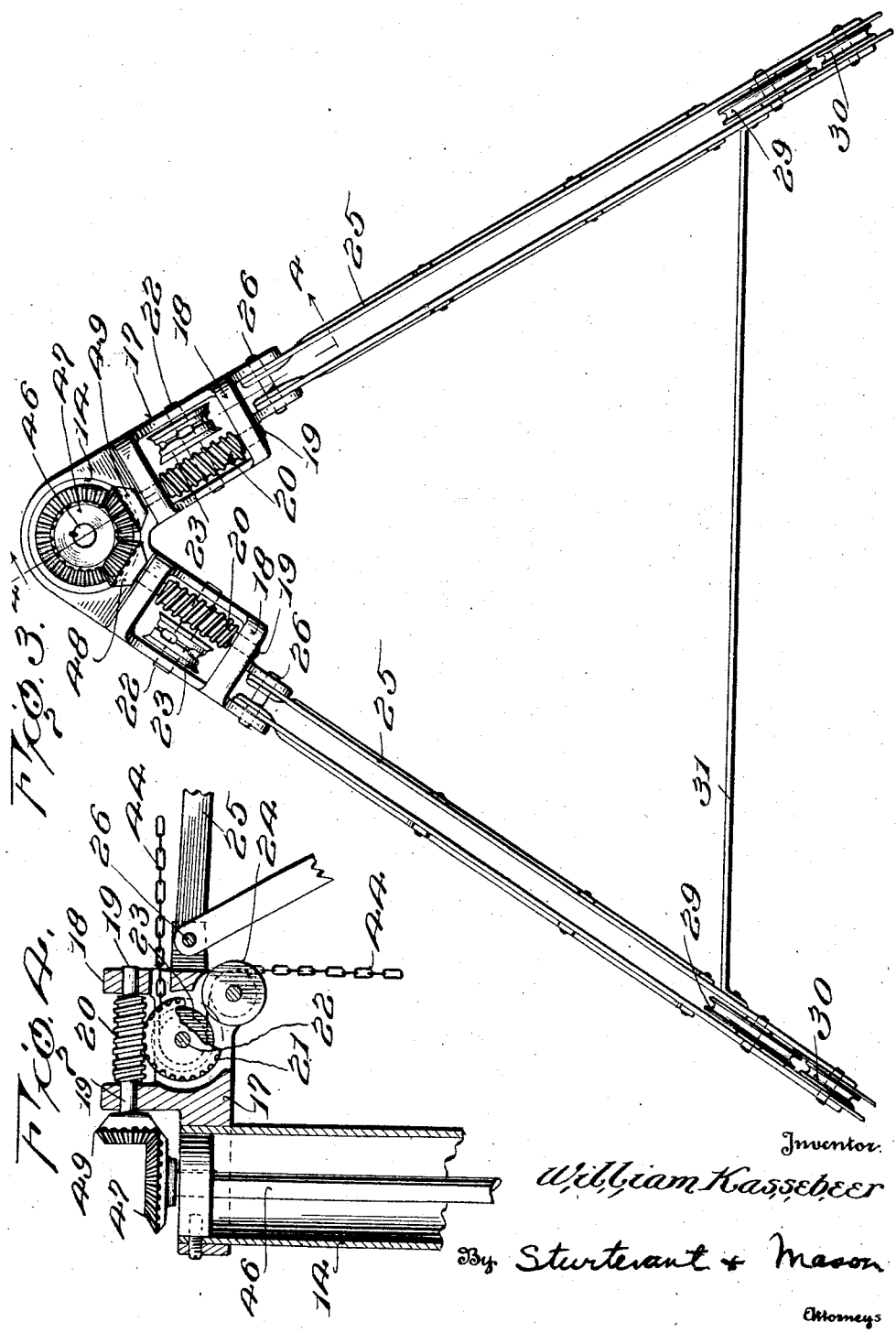

July 14, 1925.
W. KASSEBEER
1,545,664
APPARATUS FOR CONVEYING AND LOADING CROPS
Filed June 17, 1922   4 Sheets-Sheet 4
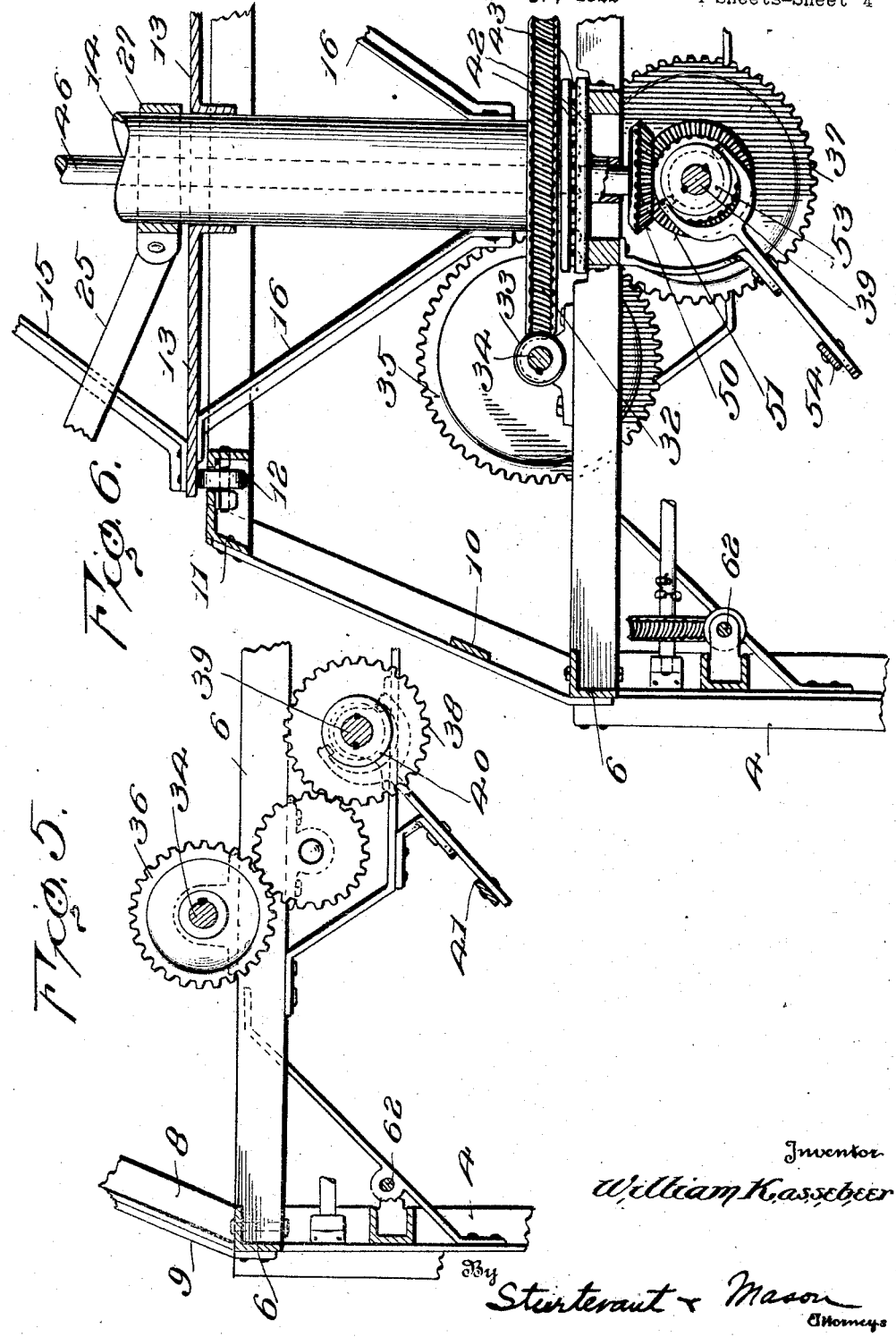

Patented July 14, 1925.

1,545,664

UNITED STATES PATENT OFFICE.

WILLIAM KASSEBEER, OF LIHUE, TERRITORY OF HAWAII.

APPARATUS FOR CONVEYING AND LOADING CROPS.

Application filed June 17, 1922. Serial No. 569,101.

*To all whom it may concern:*

Be it known that I, WILLIAM KASSEBEER, a citizen of the United States, residing at Lihue, in the county of Kauai, Territory of Hawaii, have invented certain new and useful Improvements in Apparatus for Conveying and Loading Crops, of which the following is a description, reference being had to the accompanying drawing, and to the figures of reference marked thereon.

This invention relates to an apparatus for conveying and loading crops, and is particularly designed for use in sugar cane fields of sugar plantations where portable or permanent railway tracks and railway cars are used to convey the cane from the fields to the mill.

One of the objects of the invention is to provide an automotive tractor with hoisting mechanism which permits the loading and unloading of crops into railroad cars without the necessity of any turning of the tractor upon which the hoisting mechanism is mounted so that when a tractor is loading sugar cane into a line of railroad cars, the tractor can be run forward, the cane picked up in boxes or slings; the tractor can then be moved in proximity to the railroad cars and the hoisting mechanism operated so that their loads overhang and can be readily dropped into the cars.

Still another object of this invention resides in the construction whereby the box or slings of sugar cane or the like are lifted from the ground and supported on the tractor while the tractor is moving from loading to unloading position.

Still a further object of this invention resides in the novel mechanism whereby the power plant of the tractor is utilized for shifting the hoisting mechanism both vertically and horizontally so that the load can be properly conveyed to the desired position.

Further objects of this invention comprise the novel features of the turntable construction on which the hoisting arms are mounted; the driving mechanism for reversely moving this turntable in a horizontal plane; the driving mechanism for the hoisting chains carried by the hoisting arms whereby they are driven in either direction from the power plant of the tractor, and the novel means for swinging the boxes of cane inwardly so that they can be supported on the tractor frame.

These and other objects will in part be obvious and will in part be hereinafter more fully disclosed.

In the drawings which show by way of illustration one embodiment of the invention—

Figure 1 is an end view of the apparatus showing a box of sugar cane supported on the tractor at the left, and a similar box of sugar cane in the act of being raised from the ground by the hoisting arm;

Fig. 2 is a side view of the apparatus showing one of the boxes supported on the front of the tractor, certain parts of the frame of the super-structure being broken away to show the driving mechanism;

Fig. 3 is a plan view of the hoisting arms;

Fig. 4 is a sectional view on the line 4—4 of Fig. 3;

Fig. 5 is a detail view of certain gearing of the frame construction, and

Fig. 6 is an enlarged detail view of the driving mechanism for the turntable and mast.

Referring now more particularly to the accompanying drawings, an automotive tractor is shown in conventional outlines as provided with any type of tractor tread 1 driven in the usual manner from the power plant 2 provided with a fly wheel 3. For the purpose of this invention, the framework includes a super-structure comprising vertical uprights 4 and lower and upper horizontal channel members 5 and 6 which constitute the skeleton frame which is extended upwardly and inwardly as by means of further channel members 7 and 8 suitably braced as at 9 and 10 to support a top plate 11. This upper structure forms a sort of a tower for supporting the turntable on which the hoisting arms are mounted. To this end, this upper platform 11 is provided on its outer edge with a series of rolls 12 to constitute a frictionless tread for the turntable 13 supported on these rolls. This turntable 13 rigidly connects with a hollow mast 14 which projects upwardly from the center of the machine and through the super-structure and tower. The upper end of the mast is suitably braced and supported on the turntable 13 by means of braces 15 and the bottom of the mast is likewise braced to the bottom of the turntable by means of braces 16. The mast which rotatively moves with the turntable is provided on its upper end with hoisting arms of any desired construction. The present invention shows the preferable form. In this instance, the upper end of the mast 14 has rigidly fixed thereto a casting 17 which is provided with two V-arranged supporting journal boxes or arms, each of which carries a means for driving the hoisting chains hereinafter described. As shown in Figures 3 and 4, each one of these journal boxes or arms 18 is suitably hollowed or cored out to form bearings for a shaft 19 on which is carried a worm 20 meshing with a worm wheel 21 carried on a shaft 22 located at right angles to the shaft 19. On this shaft 22 is also mounted a chain pulley 23 and a suitable guide pulley 24. Each one of these V-arranged blocks or bearings is provided with a relatively long extension comprising spaced triangular shaped arms 25 which are secured to the blocks as at 26 and to a clamping block 27 secured to the mast 14. These triangular beams 25 are braced by suitable cross bars 28. The outer ends of the triangular beams provide spaced bearings for chain pulleys 29 and 30. These pulleys are constructed and arranged to form a guide for the outer end of the hoisting chains. These extensions 25 of the V-arranged arms are braced at their outer ends by means of a suitable cross brace 31.

In order to move this turntable and the hoisting arms carried thereby rotatively with respect to the tractor and its super-structure, certain driving mechanism is arranged. The preferred form of this driving mechanism is shown clearly in Fig. 6 wherein the base of the mast 14 is provided with a concentrically attached worm wheel 32 which in turn meshes with a worm 33 mounted on a shaft 34 carried in suitable bearings on the super-structure. The shaft 34 also carries a large gear 35 and a smaller gear 36, the former meshing with a gear 37 and the latter meshing with a gear 38, both of which are fixed on a counter shaft 39 also carried in bearings on the tractor frame. The gears 37 and 38 are loose on shaft 39 but are connected thereto by means of a clutch 40 splined on shaft 39 and adapted to be thrown in either direction to couple gears 37 and 38 to the shaft 39. A suitable lever 41 operable from a convenient point on the tractor is provided for shifting this clutch 40. The lower end of the mast is provided with an upper plate which is supported on a plate 42 mounted on the tractor, suitable ball bearings 43 providing the necessary bearing.

In order to raise and lower the hoisting chains 44 carried by the hoisting arms 25, there is provided suitable driving mechanism comprising a vertical shaft 46 which projects vertically upwardly through the mast 14 concentrically therewith. It is provided on its upper end with a bevel gear 47 which meshes with bevel gears 48 and 49, each mounted on the inner end of its respective shaft 19, carried on each bearing block 18. In this manner, the bevel gears 48 and 49 always mesh with the bevel gear 47 irrespective of the position of the hoisting arm 18 relative to the tractor. In a like manner, the lower end of the shaft 46 is provided with a bevel gear 50 which meshes with bevel gears 51 and 52 mounted on shaft 39. The bevel gears 51 and 52 are likewise loose on the shaft but are selectively keyed thereto by means of an intermediate clutch 53 operated by a shipper lever 54 controlled from a desired point on the tractor. By means of this construction, the chains 44 can be either raised or lowered. The shaft 39 is driven by means of a belt 55 connected to the fly wheel 3 of the engine and to a suitable pulley 56 controlled by means of a shiftable pulley 57 mounted on an arm 58 controlled by a lever 59 to tighten or loosen the belt when it is desired to throw the belt drive in or out in the usual manner. By means of the above arranged construction, the power plant of the tractor is utilized to not only move the hoisting arms angularly in a horizontal plane to position them at any point about the tractor, but also is utilized to raise or lower the hoisting chains carried by these hoisting arms.

When a load of sugar cane has been placed in the baskets or boxes in the field, and the hooks 44' on the chains 44 have engaged the usual eyes of these boxes for raising the same, by means of the hoisting mechanism, the boxes full of sugar cane can then be lifted off the ground. In this position, it is desired to support these boxes full of sugar cane on the tractor itself while the tractor is traversing from the loading position to the train of cars. To this end, suitable mechanism is arranged on the tractor swinging the laden boxes inwardly to the tractor frame and for there supporting the boxes on the frame. For this purpose, the tractor frame is provided with a projecting ledge 59 which preferably extends around the sides of the tractor so that when the inner edge of the box is supported thereby, it will constitute the necessary supporting platform. The means for swinging the boxes inwardly on to these ledges, comprise a suitable number of chains 60 which are adapted to be wound around shafts 61 and 62 carried by the tractor frame. These shafts 61 and 62 are driven by means of worm wheels 63 which in turn mesh with a worm 64 mounted on a shaft 65 operated by means of a hand wheel 66. Thus when the basket is in the position shown to the right of Fig. 1, it can be raised slightly, at which time, the hook on the chain 60 is inserted through a suitable eye on the basket. The hand wheel 66 is then operated to wind the chain about its shaft and thereby draw the baskets or boxes inwardly on to the supporting ledge 59 to carry the baskets from one place to another and to take the strain off the hoisting mechanism during this interval. It is obvious that any other suitable form of mechanism for accomplishing this function may be substituted, and practically the same may be driven from the power plant of the tractor if desired.

The boxes for the sugar cane are constructed of any desired material and of any size. These boxes are preferably provided with two doors hinged to open in the center. The doors are held in position by means of the usual link mechanism and are operated to be released by means of the suitable pull lever. Instead of these boxes, slings can be used.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. In combination, a frame, tractor treads carried thereby, means for actuating said treads to project the frame, a hoisting device mounted on said frame, means for swinging said hoisting device to position the same over either side of said frame, means to operate said hoist to raise a load, load supporting ledges located along either side of and near the base of said frame, and means carried by said frame for swinging a hoisted load inwardly so as to support said load on said ledge.

2. In combination, an automotive tractor, load hoisting means carried thereby and operated by the power plant of said tractor, load supporting ledges located on said tractor, and means carried by said tractor to swing a hoisted load inwardly to a position to be supported on one of said ledges.

3. In combination, an automotive tractor, a super-structure carried thereby, a turntable angularly movable on said super-structure, means operated by the power plant of said tractor for shifting said turntable, an upstanding mast mounted on said turntable, a hoisting arm carried by said mast and projecting laterally of said tractor, a shaft passing centrally through said mast, means operable from the power plant of said tractor for rotating said shaft, a hoisting chain carried by said hoisting arm, and means operable by said vertical shaft for operating said chain.

4. In combination, an automotive tractor, a super-structure thereon, a turntable mounted for angular movement on said super-structure, a driving bevel gear, an upstanding mast rigid with said turntable, a frame rigid with said mast, a bevel gear carried by each arm and meshing with said first-mentioned bevel gear, a hoisting chain carried by each arm, means driven by the bevel gear of each arm for operating its respective chain, and means operative from the power plant of the tractor for operating said upstanding shaft and for operating said mast.

5. In combination, an automotive tractor, a super-structure carried thereby, a turntable angularly movable on said super-structure, an upstanding mast mounted on said turntable, a laterally extending hoisting arm carried by said mast, a worm gear carried by the base of said mast, a train of gearing connecting said worm gear with the power plant of the tractor and including means for reversing the rotation of said worm gear, a shaft passing centrally through said mast, a bevel gear on the upper end of said shaft, a bevel gear carried by said hoisting arm and meshing with the bevel gear on said shaft, means on said arm and driven by the bevel gear thereon for raising and lowering a load, a bevel gear on the lower end of said shaft, a counter shaft, opposed bevel gears mounted thereon and meshing with the bevel gear on said upstanding shaft, and means for clutching one or the other of said opposed gears to said shaft, and means for driving said shaft from the power plant of the tractor.

In testimony whereof, I affix my signature.

WILLIAM KASSEBEER.